Oct. 21, 1930.  W. E. SWERN  1,779,377
TIRE FORMING MACHINE
Filed Aug. 23, 1926  2 Sheets-Sheet 1
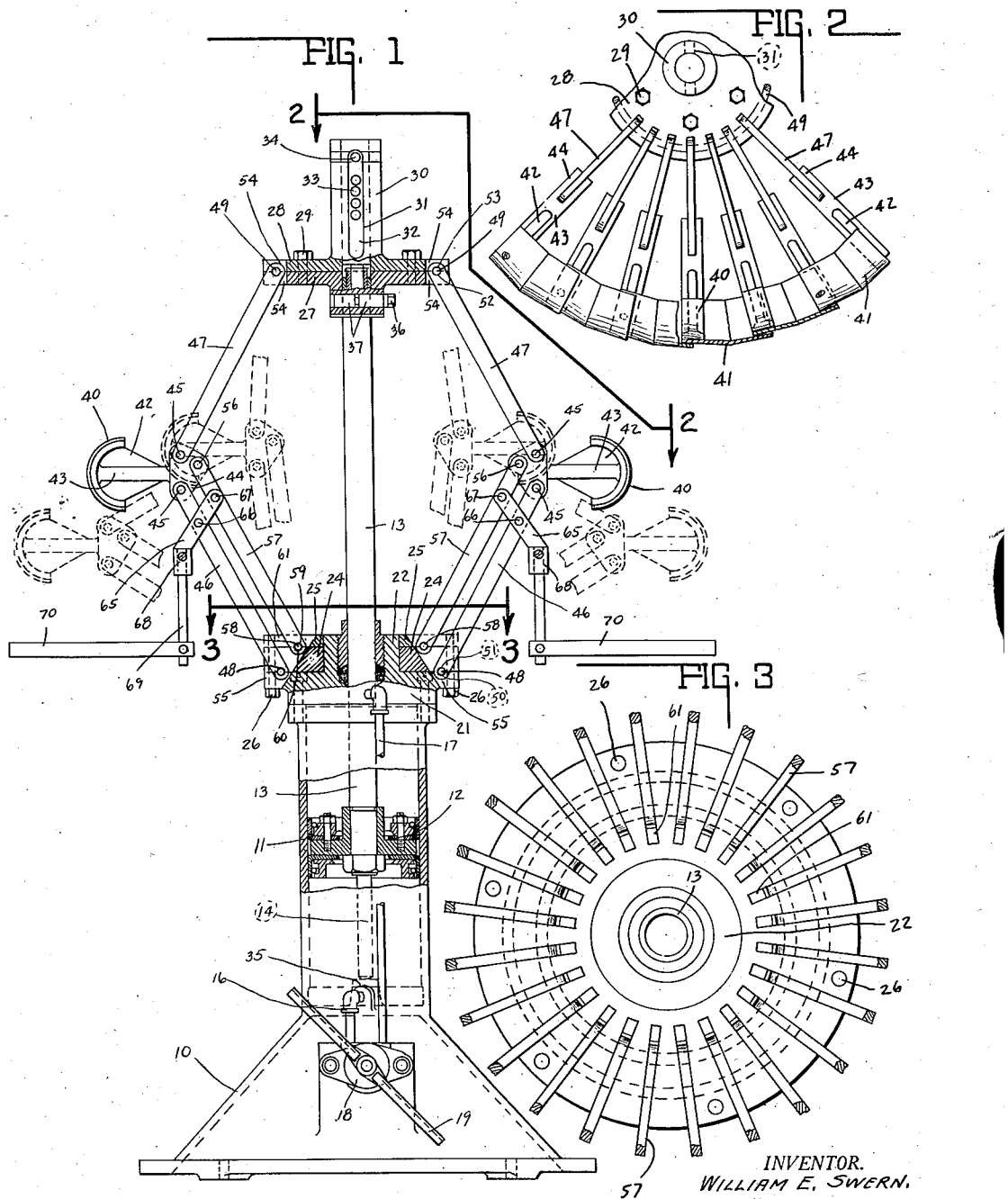
INVENTOR.
WILLIAM E. SWERN.
BY
Lockwood & Lockwood
ATTORNEYS.

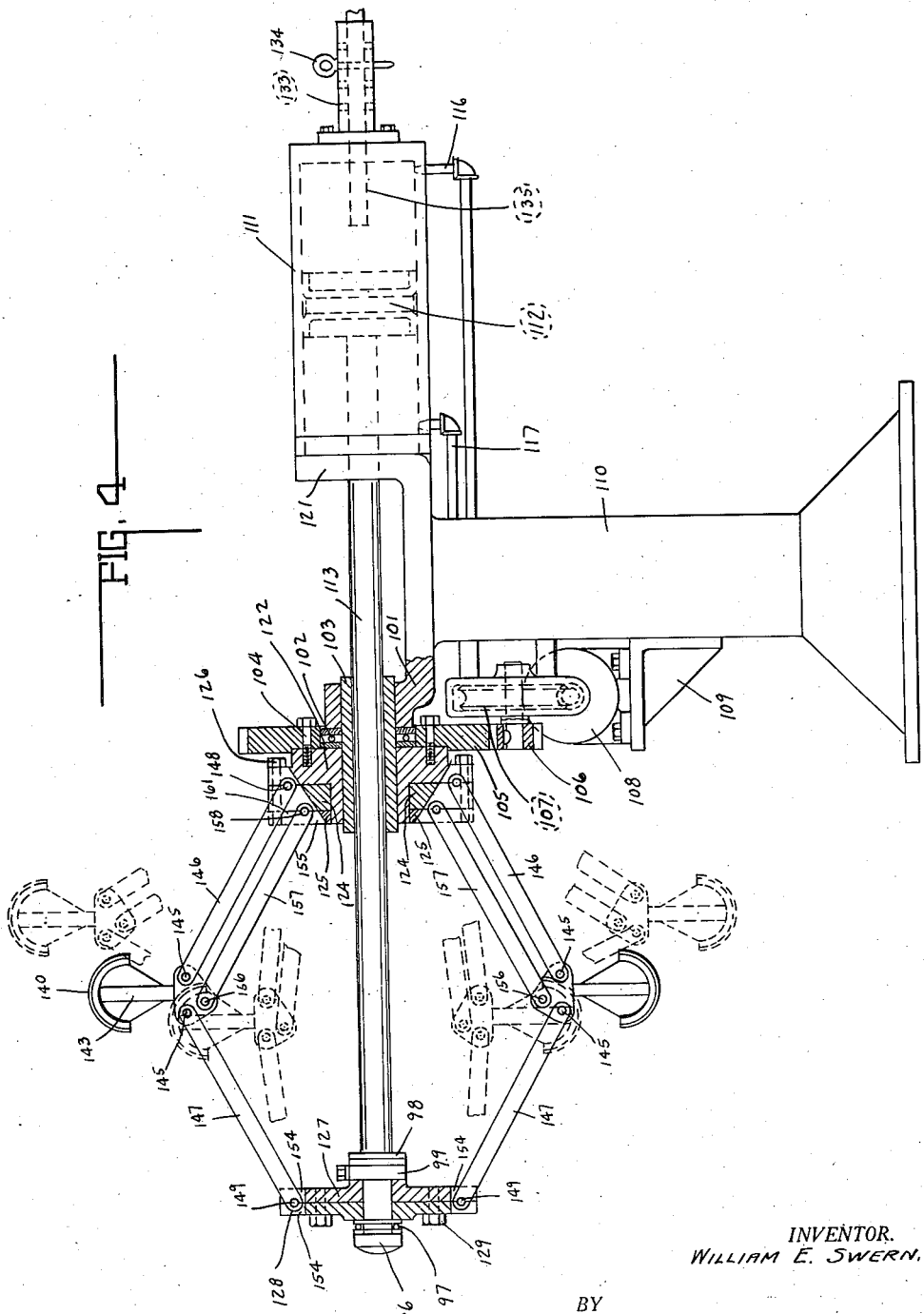

Patented Oct. 21, 1930

1,779,377

UNITED STATES PATENT OFFICE

WILLIAM E. SWERN, OF KOKOMO, INDIANA, ASSIGNOR, BY DIRECT AND MESNE ASSIGNMENTS, OF ONE-HALF TO THE FISK RUBBER COMPANY, OF CHICOPEE FALLS, MASSACHUSETTS, A CORPORATION OF MASSACHUSETTS, AND ONE-HALF TO THE GOODYEAR TIRE & RUBBER COMPANY, OF AKRON, OHIO, A CORPORATION OF OHIO

TIRE-FORMING MACHINE

Application filed August 23, 1926. Serial No. 130,884.

This invention relates to an expanding device for mechanically expanding drum type tires of the flat or semi-flat type into tire casing formation prior to curing.

The chief feature of the invention consists in the utilization of a considerable number of substantially identical arcuate segments telescopically associated together for forming an annular core substantially circular at the extremes of the extending and contracted movement and for all intermediate positions.

The chief feature of the invention consists in the arrangement of the considerable number of segments in continuous over-lapping or telescopic arrangement and the mounting thereof in an improved manner, whereby the same are always maintained in the same plane, that is, without cocking and the extending and contracting parts are secured in operative and spaced relation through improved connections.

Another feature of the invention consists in the arrangement of certain of the parts such that the expanding machine is adapted to expand the tire casing in drum formation of a predetermined width through a given range, for example, if desired for 31 x 4 tires the same will expand up to and including 34 x 4 tires without change of the device other than a single adjustment.

The full nature of the invention will be understood from the accompanying drawings and the following description and claims:

In the drawings Fig. 1 is an elevational view of a vertical single unit expanding machine with parts broken away to show the same and other parts in section, the full line positions indicating the expanded position; the inner dotted lines indicating the contracted or casing receiving position and the outer dotted lines indicating the extreme limit of the tire expanding machine for larger tires than that for which the machine has been expanded as shown by the full lines. Fig. 2 is a top plan view of a portion of the expanding machine and is taken on line 2—2 of Fig. 1 and in the direction of the arrows. Fig. 3 is a transverse sectional view taken on line 3—3 of Fig. 1 and in the direction of the arrows. Fig. 4 is an elevational view of a modified form of the machine with parts broken away to show the same and other parts in detail.

In the drawings 10 indicates a suitable framework or standard which is provided with a tubular extension 11 in the form of a double acting cylinder adapted to contain a piston 12 carried by a tubular rod 13 telescopically mounted on the rod 14. Suitable connections 16 and 17 are adapted to supply and exhaust fluid under pressure to the opposite ends of the double acting cylinder, the same being controlled by valve 18 having the operating member 19 arranged for treadle operation if desired.

The cylinder head 21 is reduced at 22 to receive a pair of superposed plates 24 and 25. The cylinder head 21 together with the plates or collars 24 and 25 are clampingly associated together in rigid relation by suitable bolts 26 for a purpose hereinafter set forth. Mounted above and coaxial with the cylinder head 21 and plates 24 and 25 is the base plate 27 and associated therewith is a cover plate 28, the same being secured together by bolts 29 in similar relation to the plates 24 and 25 and for the same purpose. A hub portion 30 integral with cover plate 28 is provided with a longitudinal slot 31 and mounted within said tubular portion is a plug member 32 having a plurality of holes 33 extending therethrough. A pin 34 is adapted to be positioned in any one of the holes 33, the uppermost hole representing in the present illustration that position corresponding to the expansion necessary to form 29 x 4.40 tire. The next lower hole corresponds to a 31 x 4 and the others thereunder 32 x 4, 33 x 4 and 34 x 4. The rod 14 engages an abutment 35 positioned in the lower end of the cylinder 11 and further downward movement of plates 27 and 28 is impossible when the member 32 engages the upper end of this rod and the pin 34 engages the end wall of the slot 31 in the hub 30. This is the full line position shown in Fig. 1 and corresponds to the extended position or 29 x 4.40 tire. The outer dotted position corresponds to that when the pin is positioned in the lowermost hole 33.

The base plate 27 is clampingly associated with the tubular piston rod 13 as by the clamping bolts 36 and the ear portions 37 integral with said base plate. The arrangement is such that when the piston 12 is in its uppermost position the base plate is positioned at its greatest distance from the cylinder head 21 and therefore the expanding mechanism is in the dotted line position shown substantially within the full line position in Fig. 1. Thus, no matter what size tire is utilized, substantially the same bead diameter is employed herein and the same corresponds to this upper limiting position of the pivot 12.

From the foregoing it will be apparent collapsible or retractable movement of the expanding mechanism is secured by applying fluid pressure to conduit 16 and moving base plate 27 outwardly into its extreme extended position. Thereupon the drum type casing is applied and absolutely centered and the fluid pressure is reversely applied to cylinder 11 through pipe 17 which retracts the piston rod 13 until rod 14 engages stop 35 and pin 34 engages the end of the slot. The foregoing detailed arrangement and adjustable construction constitutes one of the main features of the invention.

The particular type of expanding mechanism and the means for mounting the same constitute the second feature of the invention. In the present invention twenty-four substantially identical segments are illustrated. Herein each comprises a substantially semi-circular arcuate segment 40, each having a semi-circular and arcuate hood or sleeve extension 41 extending circumferentially from the segment 40 and telescopically associated, see Fig. 2, at the end portion thereof, with the adjacent segment 40. The segment 40 is provided with radially and transversely positioned reinforcing ribbing 42 and 43, terminating in a triangular base 44 having a pair of pivots 45 arranged symmetrically with respect to the median plane of the segmental construction. The pivots 45 extend across said triangular base, the same being slotted to receive the rods 46 and 47. The opposite ends of the rods 46 are pivoted at 48 and the opposite ends of rods 47 are pivoted at 49. Pivot 48 comprises a split rim mounted in semi-circular and annular grooves 50 and 51, registering with each other and formed respectively in the cylinder head 21 and the adjacent face of the plate 24. Pivot 49 in the form of an annular ring is receivable by a similar annular groove formed by semi-circular annular registering grooves 52 and 53 formed respectively in the base and cover plates 27 and 28. Said base and cover plates are provided with registering notches 54 and 55 that limit lateral movement on the rod or ring 49 of the toggle link 47. Similarly cylinder head 21 and plate 24 include radial registering recesses 55 preventing circumferential or lateral movement of the toggle link 46 on the pivot ring 48. The resultant construction is therefore that of a toggle and the several segments in the movement of the pivots 45 towards and away from the axis causes increased telescopic movement or decreased telescopic movement corresponding to contraction or expansion of the expanding machine when the piston 12 is elevated and lowered, respectively.

To insure substantially uniform plane of movement of all of the segments simultaneously and therefore parallel movement thereof each base includes a pivot 56 extending transversely of the base and the latter being slotted as aforesaid to receive a parallel link 57 which is pivotally mounted upon the ring 58 in the notch 55 formed in plate 24. Ring 58 is mounted in the semi-circular grooves 59 and 60 formed in the opposite face of plate 24 and in the adjacent face of plate 25, respectively, said latter plate being notched or recessed at 61 to register with the notches 55 in the cylinder head 21 and plate 24. Pivot 58 is positioned with respect to 48 such that the links 46 and 57 are always movable parallel to each other and constitute a parallelogram. Thus, the several segments or segmental constructions are always movable into parallel planes without cocking.

In order to insure proper casing positioning certain adjacent links 46 and 57 are provided with a connecting member 65 pivotally supported at 66 and 67 on said links 46 and 57 and the terminating end 68 thereof adjustably supports the rod 69 carrying the guide member 70. The same constitutes a guide or limiting member for insuring accurate positioning of the drum casing prior to expansion so that the expansion will be centrally secured with respect to the drum casing. The guide means 70 are of sufficient length to accommodate the several sizes of tires and the transverse arm 69 are of sufficient length to accommodate the width of the drum type casing prior to expansion required for the several sizes of tires.

In Fig. 4 a modified form of the machine is shown and in said figure the same parts are indicated by numerals of the 100 series corresponding to the numerals applied to like parts in the machine shown in Figs. 1 to 3 inclusive. The plates 128 and 127 are rotatably mounted on the shaft 113 in this instance, and interposed between the end 96 of shaft 113 and said plated construction is a roller bearing 97. A stop collar 99 with additional elements 98 limits the position of the plated construction with respect to the end of the shaft 113 and permits relative rotation therebetween. The base 110 of the machine is herein shown provided with the cylindrical head 121 and the supporting arm 101 in which is mounted the sleeve 103 surrounding shaft 113 and supporting the plated construction 122, etc.

The plate 122 is secured by the bolts 104 to a gear wheel 105 meshing with pinion 106 driven by the gear reduction 107 in turn operable by the motor 108 mounted on bracket 109 carried by the base 110. The free end of the cylinder 111 carries an adjustable stop member 135, the adjustment being secured by pin 134 registering with holes 133. The resultant construction consists of a whole machine pneumatically reciprocally and electrically rotatable. The shaft 113 does not rotate.

The invention claimed is:

1. The combination with a tire band shaping device having a plurality of radially movable band engaging members disposed in substantially annular form, of a band centering mechanism comprising adjustable means movable independently in an axial direction with respect to the annular form of the band engaging members for gauging the position of the band with respect to the members, and means operatively connecting the adjustable means to the shaping device.

2. A tire-manipulating machine comprising a plurality of segments constituting an annulus variable in circumference, means connected to the annulus for moving the segments in a direction transversely of the axis of the annulus, and means for maintaining the segments constantly in the same relation to the plane of the annulus as the circumference of the latter is varied.

3. A tire-manipulating machine comprising a plurality of segments constituting an annulus variable in circumference, links pivotally connected to the segments, means connected to the links for actuating the segments to vary the size of the annulus, and means connected to the segments for maintaining them constantly in the same relation to the median plane of the annulus in any of its various positions.

4. A tire-manipulating machine comprising a plurality of segments constituting an annulus variable in circumference, a pair of links pivotally connected to each segment, means connected to the links for actuating the segments to change the effective circumference of the annulus, and means connected to the annulus for maintaining movement of the segments always in the median plane of the annulus as its circumference is varied.

5. A tire-shaping machine comprising a plurality of segments constituting an annulus variable in circumference, a pair of links connected to each segment, a pair of relatively movable members pivotally connected to the links on opposite sides of the annulus, means for actuating one of the members to change the circumference of the annulus, and means adjustable substantially axially of the annulus serving as a stop for the last-mentioned movable member to vary the effective maximum circumference of the annulus.

6. A tire-shaping device comprising a plurality of segments constituting an annulus variable in circumference, a support disposed axially of the annulus, a pair of co-axial hubs mounted on the axial support, links pivotally connecting the hubs to the segments, and reciprocal means operable in conjunction with the axial support for relatively moving the hubs between predetermined limits.

7. A tire-shaping device comprising a plurality of segments constituting an annulus variable in circumference, a pair of co-axial hubs, a pair of links connecting each segment to the hubs, means for slidably supporting one of the hubs co-axially of the annulus, and means for slidably actuating the last-mentioned hub within predetermined limits.

8. A tire-shaping device comprising a plurality of segments constituting an annulus variable in circumference, a pair of links pivotally connected to each segment, actuating means operatively connected to the links for varying the circumference of the annulus, and stationary means spaced from the annulus and having pivotal connections to the links, the pivotal points of each pair of links defining a parallelogram.

9. A tire-shaping device comprising a plurality of segments constituting an annulus variable in circumference, a pair of parallel links pivotally connected to each segment, actuating means operatively connected to the links for varying the circumference of the annulus, stationary means spaced from the annulus for pivotally supporting the links, the pivotal points of each pair of links defining a parallelogram, and tire gauging means suspended from the links.

10. A tire-shaping device comprising a plurality of segments constituting an annulus variable in circumference, a pair of links pivotally connected to each segment, actuating means operatively connected to the links for varying the circumference of the annulus, stationary means spaced from the annulus for pivotally supporting the links, the pivotal points of each pair of links defining a parallelogram, and a tire gauging support having pivotal connections to both links of each of a plurality of pairs of links, the pivotal connections of each gauging support of a pair of links defining a line parallel to one side of the parallelograms described by the pivotal points of that pair.

11. A tire-shaping device comprising a plurality of segments constituting an annulus variable in circumference, a pair of links pivotally connected to each segment, actuating means operatively connected to the links for varying the circumference of the annulus, means for supporting the actuating means, tire-gauging supports suspended from the links, said gauging supports having adjustable connections for effecting adjustment thereof axially of the annulus.

12. A tire-shaping device comprising a plurality of segments constituting an annulus variable in circumference, a pair of links pivotally connected to each segment, actuating means operatively connected to the links for varying the circumference of the annulus, means spaced from the annulus having pivotal connections to the links, the pivotal points of each pair of links defining a parallelogram, a bar pivotally connected across each of a plurality of pairs of links, the pivotal connections of each bar to a pair of links defining a line parallel to one side of the parallelogram of that pair, and an angular arm vertically adjustable in each bar, each arm having a horizontal tire-supporting portion.

In witness whereof, I have hereunto affixed my signature.

WILLIAM E. SWERN.